US012696920B2

(12) United States Patent
Jessup

(10) Patent No.: US 12,696,920 B2
(45) Date of Patent: Aug. 4, 2026

(54) FEED MIXER AND LINER THEREFOR

(71) Applicant: Penta Equipment Inc., Glencoe (CA)

(72) Inventor: Bradley Douglas Jessup, Glencoe (CA)

( * ) Notice: Subject to any disclaimer, the term of this patent is extended or adjusted under 35 U.S.C. 154(b) by 1093 days.

(21) Appl. No.: 17/835,397

(22) Filed: Jun. 8, 2022

(65) Prior Publication Data

US 2023/0397644 A1     Dec. 14, 2023

(51) Int. Cl.
| | |
|---|---|
| *A23N 17/00* | (2006.01) |
| *A01K 5/00* | (2006.01) |
| *B01F 27/1143* | (2022.01) |
| *B01F 27/922* | (2022.01) |
| *B01F 33/502* | (2022.01) |
| *B01F 35/511* | (2022.01) |
| *B01F 101/18* | (2022.01) |

(52) U.S. Cl.
CPC ............ *A23N 17/007* (2013.01); *A01K 5/004* (2013.01); *B01F 27/1143* (2022.01); *B01F 27/922* (2022.01); *B01F 33/5023* (2022.01); *B01F 35/511* (2022.01); *B01F 2101/18* (2022.01)

(58) Field of Classification Search
CPC .. B01F 33/5023; B01F 2101/18; A01K 5/004; A23N 17/007
See application file for complete search history.

(56) References Cited

U.S. PATENT DOCUMENTS

| | | | |
|---|---|---|---|
| 2009/0040868 A1* | 2/2009 | Tamminga | B01F 33/8305 |
| | | | 427/386 |
| 2009/0190440 A1* | 7/2009 | Neier | B01F 33/8305 |
| | | | 366/302 |

* cited by examiner

*Primary Examiner* — Anshu Bhatia

(74) *Attorney, Agent, or Firm* — Amarok IP Inc.; Neil W. Henderson

(57) ABSTRACT

A feed mixer and liner therefor. The feed mixer including: a container formed from two side walls, two end walls, wherein the end walls have a slope and curvature and are connected to the side walls to form an auger well, and a base connected with the side walls and end walls at a lower end thereof; and a liner configured to have a truncated conical shape that matches the slope and curvature of the end walls and fits within the auger well such that: a bottom of the liner contacts the base and has a diameter similar to a diameter of the path of the auger at the base; and a top of the liner contacts with the end walls and side walls. The auger well may include two auger wells and the liner may include two truncated conical shapes fitting in each of the two auger wells.

19 Claims, 8 Drawing Sheets

145

170

170

FEED MIXER AND LINER THEREFOR

FIELD

The present disclosure relates generally to a feed mixer such as that used for animal feed. More particularly, the present disclosure relates to a feed mixer and a liner therefor.

BACKGROUND

Feed mixers have been known and used in the agricultural industry for a long time. The feed mixer is used for processing material, such as a biomass or fodder, to prepare it for consumption by animals such as cattle or the like. Feed mixers generally include a container having a bottom and a side wall, and at least one mixing element, typically a mixing blade or auger mounted inside the container and the mixing blade or auger rotates to mix materials placed in the container. A vertical feed mixer typically includes 1, 2, or 3 vertically oriented helical augers which work to lift feed to provide a mixing action. Mixing tub end walls are typically curved and also angled away from vertical which allows lifted feed to return to the bottom of the mixing tub as well as preventing rotation of the feed mass.

Conventional mixers can have issues with wear, with making sure that all materials are adequately mixed and can also have issues with the mixing blade or auger become slowed, blocked or stuck due to some types of buildup of materials in the container.

For example, generally speaking, power consumption of vertical feed mixers can be quite high and a blockage can increase power requirements. The need to overcome blockages can also result in needing a larger drive engine or gear boxes for driving the mixing augers. Lower power requirements can allow for smaller drives and/or power consumption.

Further, conventional mixer sidewalls and end walls do not always wear uniformly from bottom to top. Most wear occurs in the bottom 24", with the wear rate increasing moving closer to the bottom of the mixing tub. This is at least partly due to the majority of the feed being lower in the mixer and can also be due to there being a gap between the mixing auger and the mixer wall, which can fill with material that is pinched and creates additional wear in addition to the extra power requirements referenced above. Some conventional mixer tubs attempt to overcome the differential wear issue by creating a thicker side wall throughout, but this can result in unnecessary weight and material utilization. Alternatively, some conventional mixers provide a thicker lower sidewall that is welded to a thinner upper wall. Lastly, some feed mixer manufacturers may provide a replaceable liner that conforms to the shape of the mixing tub and can be replaced when worn.

It should also be noted that prices of feed mixers can be competitive so a reduce cost of materials and manufacture, generally through less complex systems or apparatuses, can be beneficial.

As such, there is a need for an improved feed mixer that overcomes at least some of the issues of conventional feed mixers.

The above information is presented only to assist with an understanding of the present disclosure. No determination has been made, and no assertion is made, as to whether any of the above might be applicable as prior art with regard to the present disclosure.

SUMMARY

According to an aspect herein, there is provided a feed mixer including: a container formed from two side walls, two end walls, wherein the end walls have a slope and curvature and are connected to the side walls to form an auger well, and a base connected with the side walls and end walls at a lower end thereof; and a liner configured to have a truncated conical shape that matches the slope and curvature of the end walls and fits within the auger well such that: a bottom of the liner contacts the base and has a diameter similar to a diameter of the path of the auger at the base; and a top of the liner contacts with the end walls and side walls.

In some cases, the auger well may include two auger wells and the liner may include two truncated conical shapes fitting in each of the two auger wells. In this case, the two truncated conical shapes may be joined and provided with a gap at a center of the two auger wells.

In some cases, the feed mixer may further include an internal molding between the side walls and the liner to provide shape to the auger wells.

In some cases, the feed mixer further may include two internal moldings such that the auger well may include three auger wells and the liner may include three truncated conical shapes fitting in each of the three auger wells.

In some cases, the base may be provided with notches and the liner may be provided with tabs to fit within the notches for positioning and/or connecting the liner on the base.

In some cases, the liner may be approximately one third to one eighth of the height of the side wall.

In some cases, the liner may be formed of stainless steel.

According to another aspect herein, there is provided a liner for a feed mixer having two side walls, two end walls, and an auger wherein the end walls have a slope and are attached to the side walls, a base connected with the side walls and end walls, the liner configured to have a truncated conical shape that matches the shape of the end walls and configured such that:

a bottom of the liner contacts the base and matches the shape of the path of the auger; and a top of the liner contacts the end walls and side walls.

In some cases, the liner may be provided with tabs for positioning and/or connecting the liner on the base.

In some cases, the liner may be approximately one third to one eighth of the height of the side wall.

In some cases, the liner may be formed of stainless steel.

According to another aspect herein, there is provided a feed mixer using an auger, the feed mixer including: a container formed from two vertical side walls, two end walls, wherein the end walls have a slope and are attached to the side walls, and a base connected with the side walls and end walls; and a liner configured to have a truncated conical shape having a slope that is at least the same as the slope of the end walls and such that a bottom of the liner has a diameter that matches a diameter of the path of the auger, wherein the liner is configured such that a bottom of the liner contacts the base and a top of the liner contacts the end walls and side walls.

In some cases, the auger may include two augers, the liner may include two truncated conical shapes each having a diameter that matches a diameter of the path of each of the two augers, respectively, and the feed mixer may further include an internal molding provided to fill a space between the liner and the side walls.

In some cases, the two truncated conical shapes may be joined and provided with a gap at a center of the two auger wells.

In some cases, the liner may be approximately one third to one eighth of the height of the side wall.

In some cases, the liner may be formed of stainless steel.

According to another aspect herein, there is provided a method of fabricating a feed mixer using an auger, the method including: fabricating two vertical side walls with tabs at a lower end thereof; fabricating two end walls with tabs at a lower end thereof, the two end walls having a slope; fabricating a liner configured to have a truncated conical shape having a slope that is at least the same as the slope of the end walls and such that a bottom of the liner has a diameter that matches a diameter of the path of the auger, wherein a lower end of the liner is provided with tabs; fabricating a base having slots that correspond with the tabs on the side walls, end walls and liner; welding the side walls and end walls and liner to the base using the tabs and the slots; and welding the liner to the base using the tabs and the slots.

In some cases, the method may further include welding a top of the liner to the end walls and side walls.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides an improved feed mixer and liner therefor. In particular, a feed mixer is provided with a conical tub liner, where the cone angle matches the end wall angle of the tub but is shaped to maintain a generally constant clearance with the auger on other portions of the end wall and the side wall. In other words, the overall mixer floor must become elliptical to maintain a revolved surface of the cone, which allows the clearance to the auger can remain constant. The conical liner may be made from a high wear material to solve wear issues at the bottom of the tub.

Figure 1:
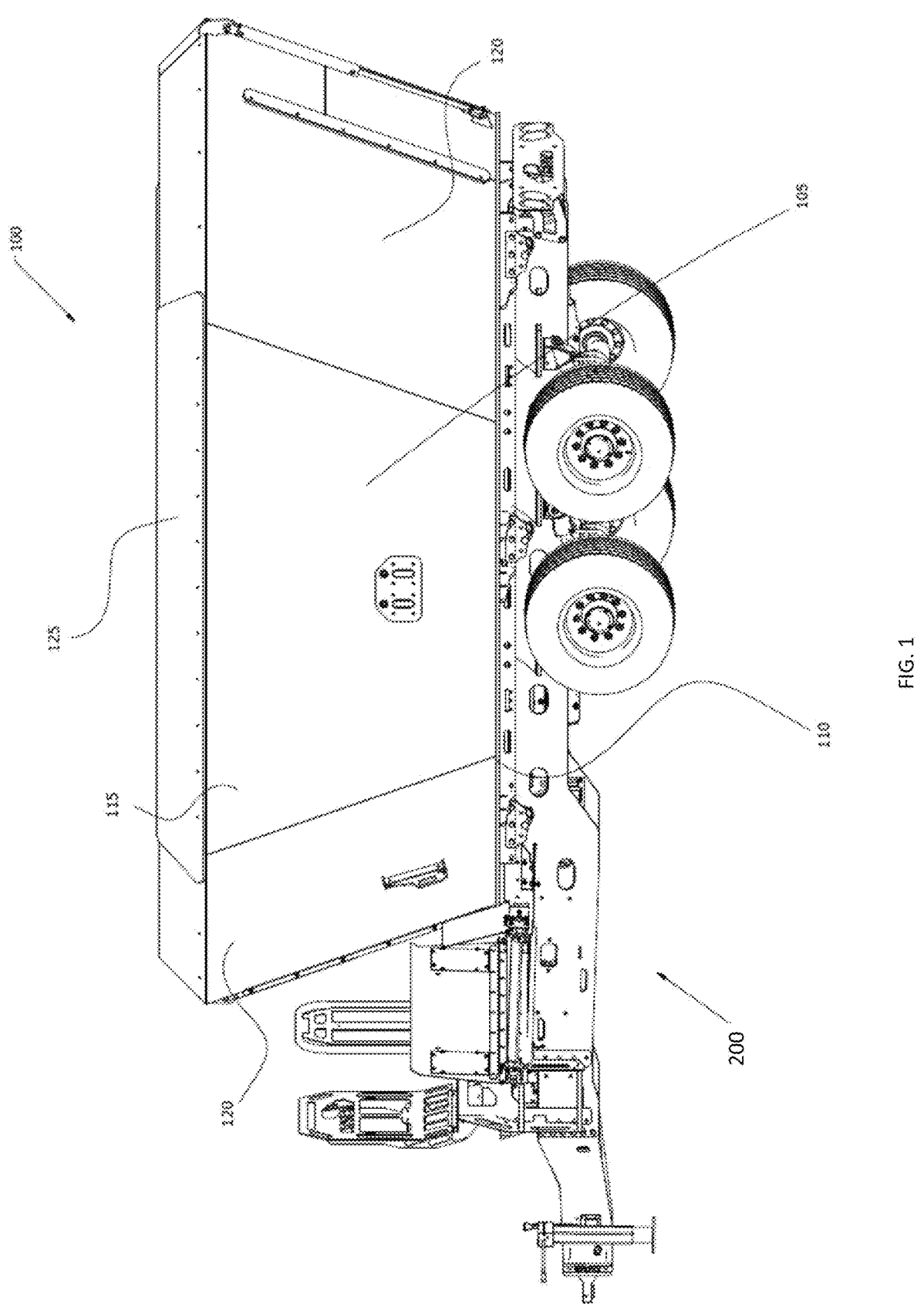
FIG. 1 illustrates a feed mixer according to an embodiment mounted on a trailer.

FIG. 1 illustrates a feed mixer 100 according to an embodiment mounted on a trailer 200. As illustrated, the feed mixer 100 includes a container 105 formed of a base 110, sidewalls 115, curved end walls 120 and a rubber liner 125 at the top of the sidewalls 115 and end walls 120. In this embodiment, the end walls 120 have a curvature of 180 degrees and are sloped such that a top of the container 105 is larger than the base. The side walls and end wall(s) form an auger well 135 in which an auger 130 (shown in FIG. 2A), which may be provided with the feed mixer 100 or separately, can be placed. FIG. 1 illustrates a two-auger mixer, with an auger 130 at each end of the feed mixer 100.

The feed mixer 100 may generally be mounted on a trailer 200 (as illustrated), on a self-propelled chassis, or the like for mobility.

Figure 2A:
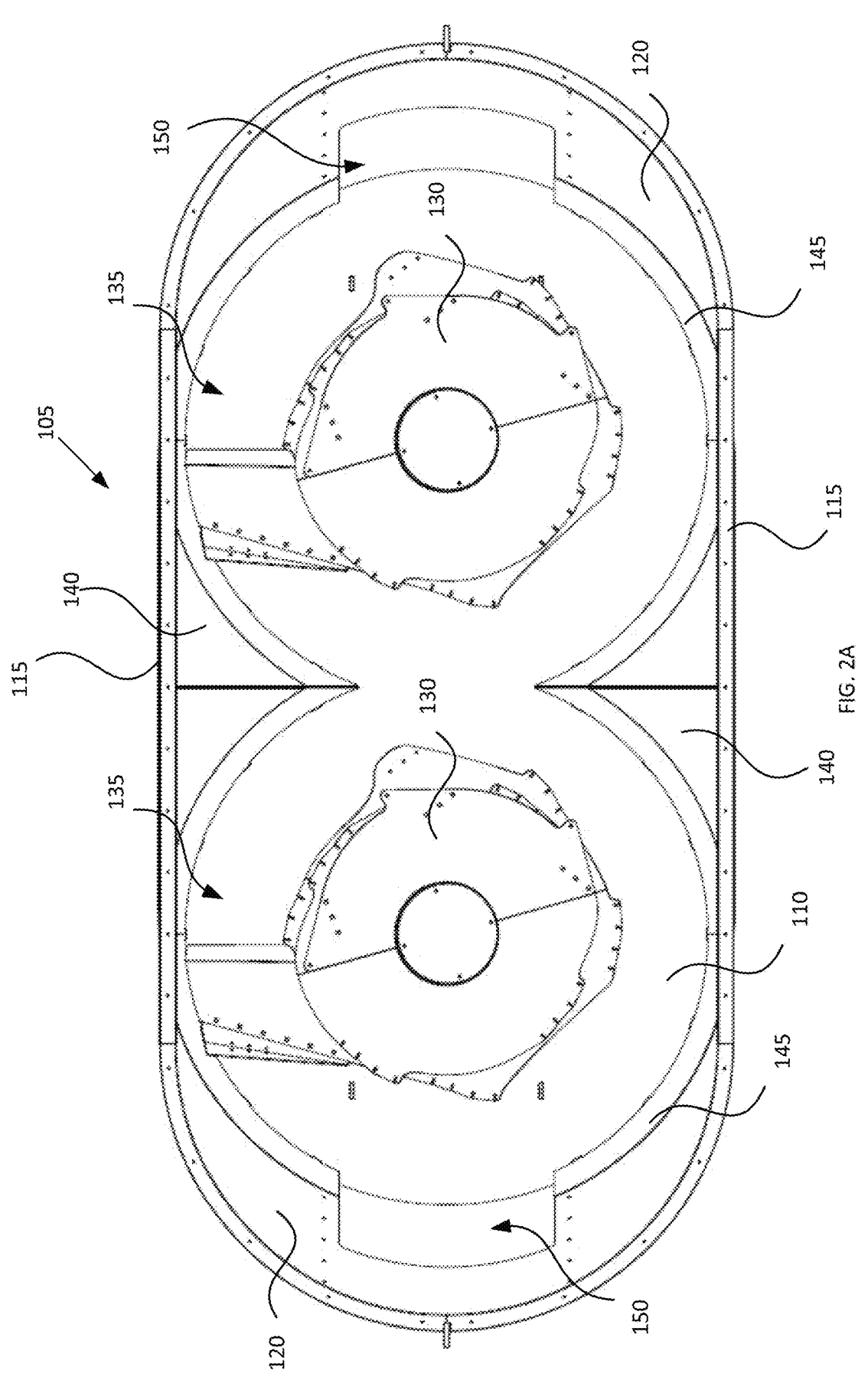
FIG. 2A illustrates a container of a feed mixer according to an embodiment herein.

FIG. 2A illustrates a top view of the container 105 according to an embodiment herein. As illustrated, the container 105 includes the base 110, the side walls 115, the end walls 120, and an auger 130 in each of two auger wells 135. In this embodiment, the side walls include an internal molding 140 to form a conical shape with the side walls and end wall(s) to provide shape and help form an auger well 135 for each of the augers 130. A liner 145 is provided at a base of the container 105. In some embodiments, the internal molding 140 may not be needed but the internal molding 140 can be helpful in keeping feed within the auger wells 135. In this embodiment, each of the auger wells 135 also includes an opening 150 that can be used to allow feed to exit the feed mixer 100. The openings 150 may be covered with a door or the like when not in use. It will be understood that various types of doors may be provided, or the doors may not always be required.

Figure 2B:
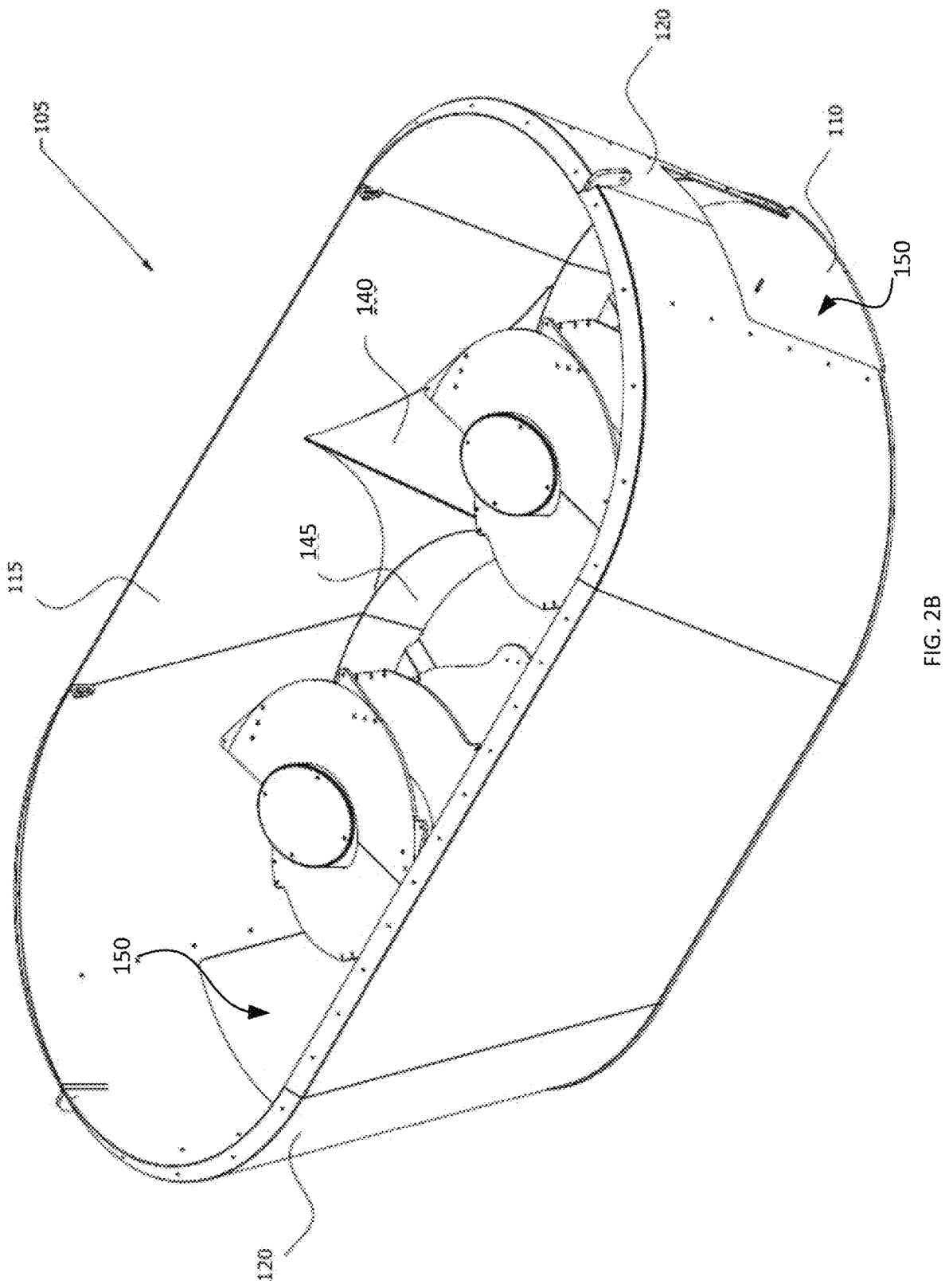
FIG. 2B illustrates a perspective view of the container of FIG. 2A.
Figure 2C:
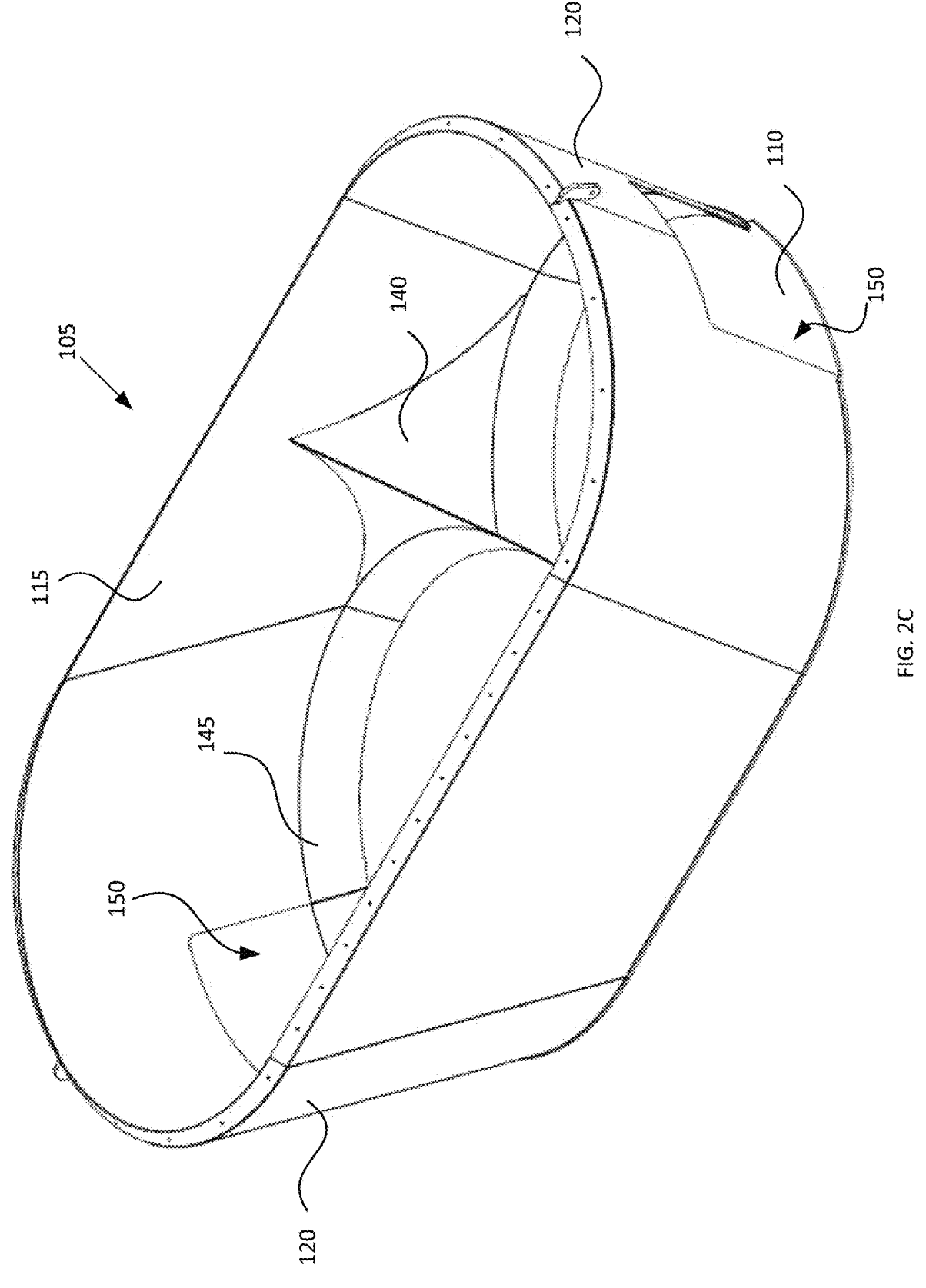
FIG. 2C illustrates a perspective view of the container of FIG. 2A in which augers are removed.

FIG. 2B illustrates a perspective view of the container 105 of FIG. 2A with the augers in place and FIG. 2C illustrates a perspective view of the container 105 of FIG. 2A with the augers removed. FIGS. 2B and 2C illustrate an example of a shape of the internal molding 140 that is provided to form at least a portion of the auger wells 135. FIG. 2C also illustrates a shape (for example, curvature and slope) of the liner 145.

Figure 3:
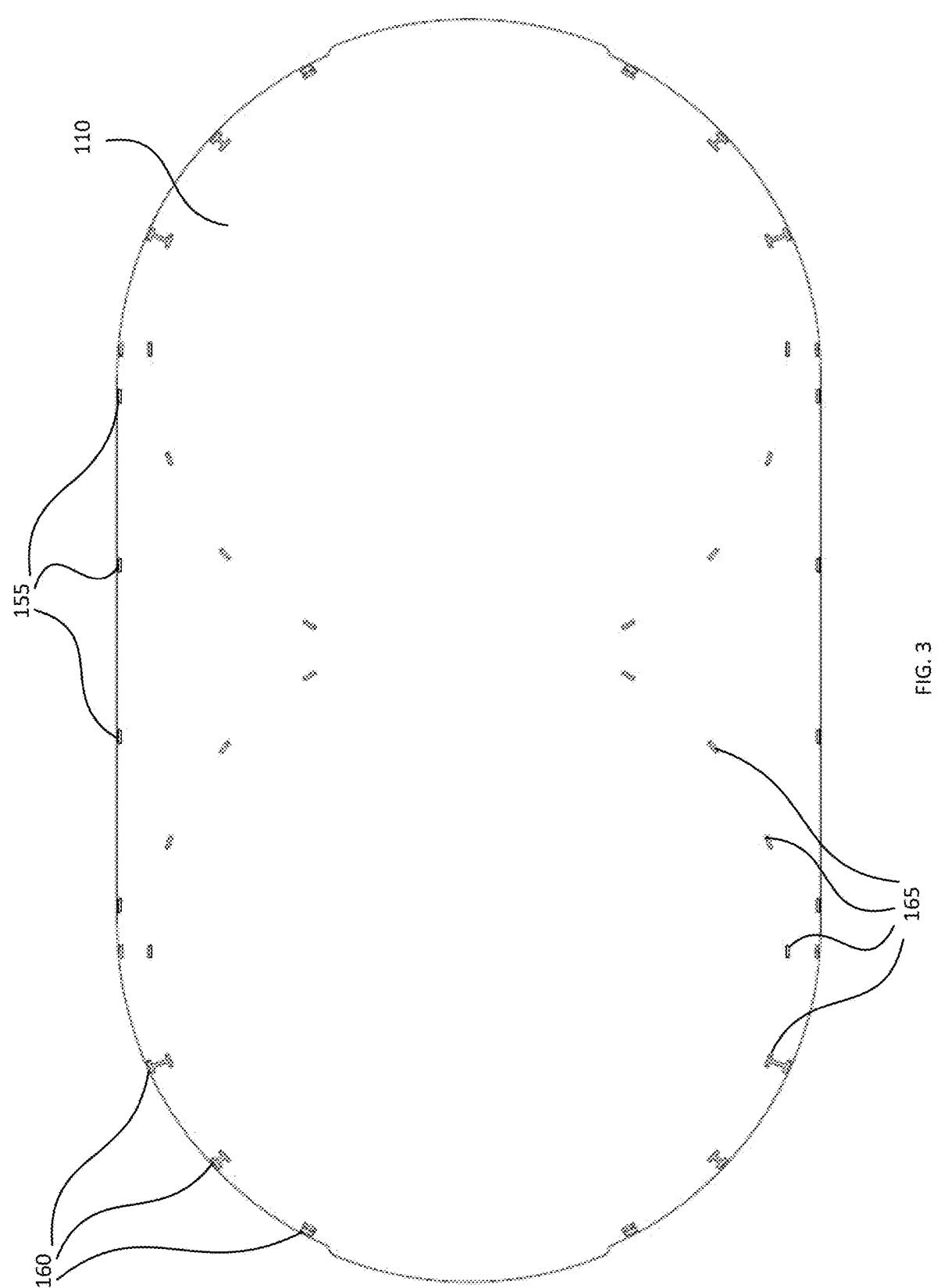
FIG. 3 illustrates a base/floor of the container of FIG. 2A.

FIG. 3 illustrates the base 110 of the container of FIGS. 2A to 2C. In this case, the base 110 is formed with holes/notches/slots for joining the side walls, end walls and liner. The holes/notches include side wall notches 155, end wall notches 160 and liner notches 165. While not specifically required, these notches can facilitate alignment and attachment of the liner 145. In some cases, to facilitate metal forming or the like, some of the liner notches 165 and the side or end wall notches 160 may be connected as shown in FIG. 3.

Figure 4:
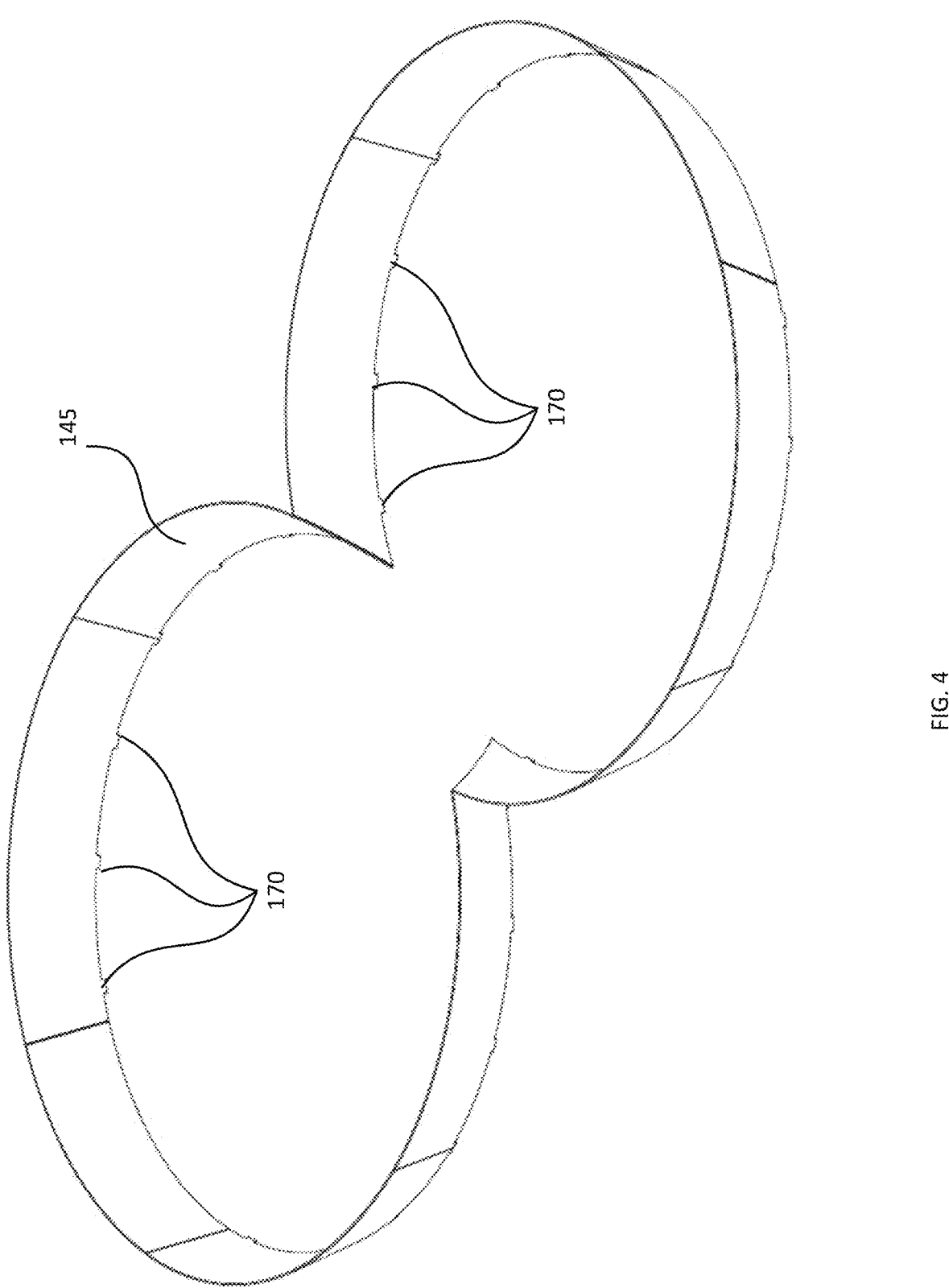
FIG. 4 illustrates a liner of the container of FIG. 2A.

FIG. 4 illustrates the liner 145 of the container of FIG. 2. In this embodiment, the liner includes tabs 170 that match with respective liner notches 165 in the base. The liner may be formed into shape and then cut to provide for the openings 150 or alternatively formed of multiple pieces of material that can be joined/welded to produce the final liner. In this case, the liner 145 is illustrated for a feed mixer with two augers and auger wells. In this case, the liner 145 is formed with a gap between auger wells 135 to allow feed to move between the auger wells 135. However, it will be understood that the liner 145 may alternatively be formed as two truncated conical shapes and placed in the auger wells 135 independently.

Figure 5:
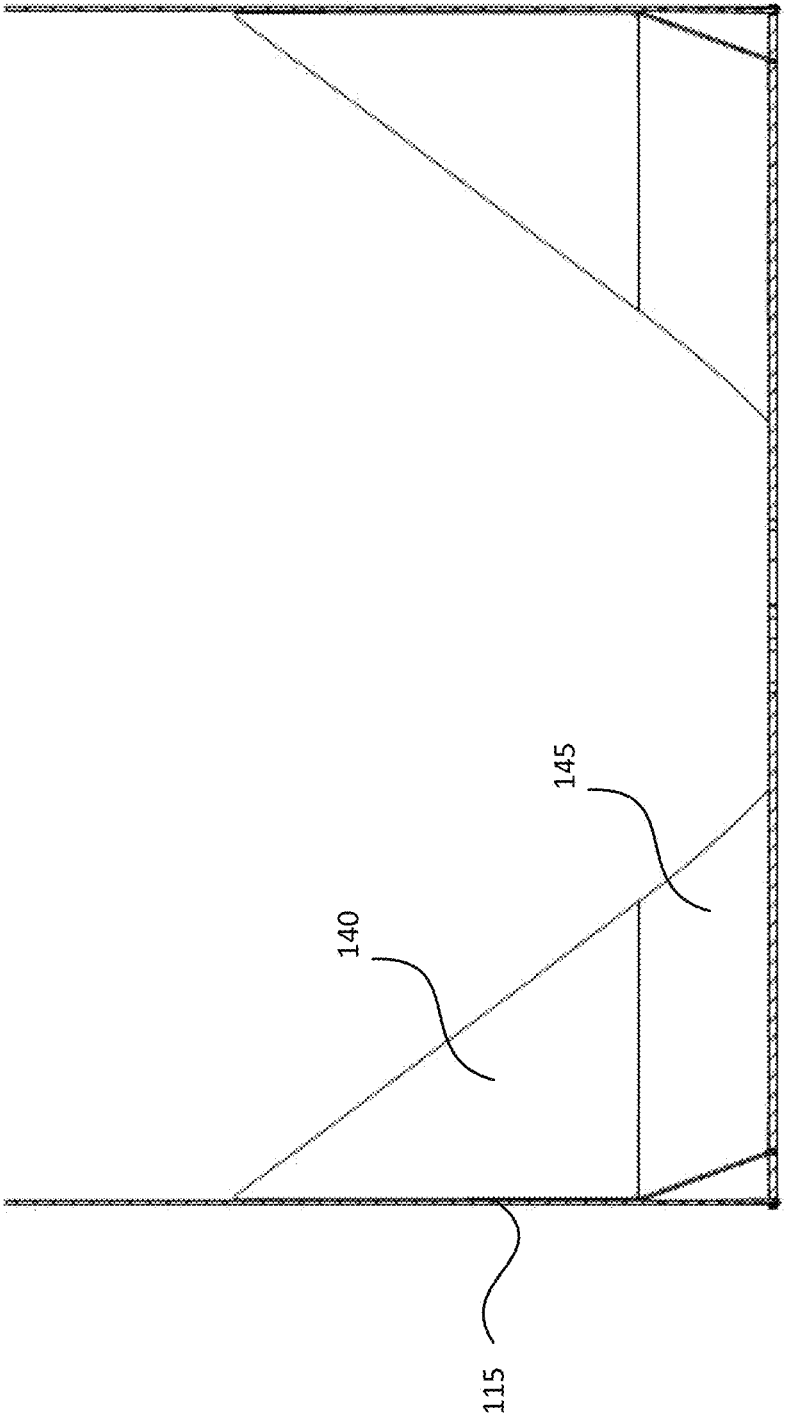
FIG. 5 illustrates a cross section of the container of FIG. 2C at a mid-point.

FIG. 5 illustrates a cross section of the container of FIG. 2A at a mid-point of one of the auger wells 135. The cross section illustrates the internal molding 140 between auger wells as well as the shape of the liner 145 as it contacts the base 110 and the side wall 115.

Figure 6:
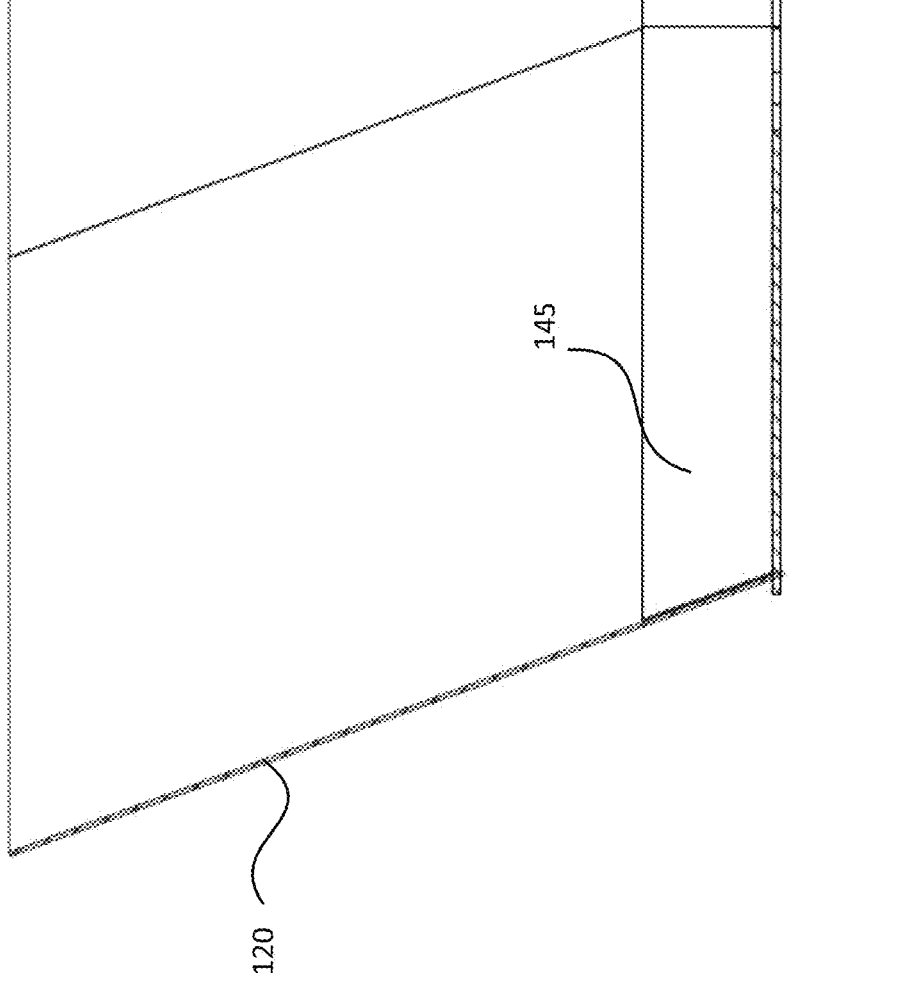
FIG. 6 illustrates a cross section of the container of FIG. 2C at a centerline of the container.

FIG. 6 illustrates a portion of a cross section of the container of FIG. 2A at a centerline of the container 105. This cross-section illustrates that the liner 145 has the same or similar angle as the end wall and is flush with the end wall at an apex of the curve in the end wall.

FIGS. 3, 5 and 6 illustrate that the liner 145 is formed as a conical section that forms a conical shape around the auger well 135 and contacts with the base 110, end wall 120, side wall 115 and, if present, internal molding 140. Preferably, the contact is such that there is not a gap as the auger 130 turns from facing the end wall 120 to facing the side wall 115. This is at least partly due to the slope of the liner 145 against the side wall 115 allowing formation of the auger well 135 that matches with the path of the auger 130 (the base of the liner 140 has a diameter similar to a diameter of the path of the base of the auger). Further, a top of the liner 145 is configured to contact the end wall 120, side wall 115 and internal molding 140, ideally, so there are no gaps at the top of the liner 145. In other words, the conical shape of the liner allows the liner to maintain a similar angle to that of the end wall and also maintain contact with the side wall and internal molding to reduce or eliminate space between the auger 130 and the various walls where feed material might otherwise gather and cause the auger 130 to bind or otherwise impede operation of the auger 130.

It will be understood that the liner 145 can may be made from a high wear material such as stainless steel, abrasion resistant steel, or the like. In some cases where the liner 145 may be intended to be replaced more frequently, the material may include mild steel or some types of plastics. The liner 145 may have an appropriate height such as, for example, 15 cm (6 in), 30 cm (12 in), 45 cm (18 in), 60 cm (24 in), or the like depending on the size of the container, the use of the container, or the like. In some cases, the liner may be approximately one third to one eighth the height of the side walls or any measurement within this range.

Embodiments of the feed mixer and liner herein are intended to reduce or eliminate the variable wall/auger gap that can occur in conventional feed mixers, particularly at a base of the auger well, thus reducing or eliminating pinch points where feed material can build up. The liner can also lead to reduction in mixing power required for a given mixer volume because the leading edge of the auger may be shorter and/or pinch points can be reduced or eliminated so there is less binding on the auger.

Embodiments herein are also intended to allow for simplified fabrication and improved exterior looks over conventional feed mixers.

In the preceding description, for purposes of explanation, numerous details are set forth in order to provide a thorough understanding of the embodiments. However, it will be apparent to one skilled in the art that these specific details may not be required. In other instances, some structures may be shown in schematic form in order not to obscure the understanding.

The above-described embodiments are intended to be examples only. Alterations, modifications and variations can be effected to the particular embodiments by those of skill in the art without departing from the scope, which is defined solely by the claims appended hereto.

What is claimed is:

1. A feed mixer comprising: a container comprising:
   two side walls;
   two end walls, wherein the end walls have a slope and curvature and are connected to the side walls to form an auger well;
   a base connected with the side walls and end walls at a lower end thereof; and
   a steel liner configured to have a truncated conical shape that matches the slope and curvature of the end walls and fits within the auger well such that:
   a bottom of the liner contacts the base separated from the side walls and has a diameter similar to a diameter of the path of an auger at the base; and a top of the liner contacts with the end walls and side walls.

2. A feed mixer according to claim 1, wherein the auger well comprises two auger wells and the liner comprises two truncated conical shapes fitting in each of the two auger wells.

3. A feed mixer according to claim 2, wherein the two truncated conical shapes are joined and provided with a gap at a center of the two auger wells.

4. A feed mixer according to claim 2, wherein the feed mixer further comprises an internal molding between the side walls and the liner to support the liner.

5. A feed mixer according to claim 1, wherein the feed mixer further comprises two internal moldings such that the auger well comprises three auger wells and the liner comprises three truncated conical shapes fitting in each of the three auger wells.

6. A feed mixer according to claim 1, wherein the base is provided with notches and the liner is provided with tabs to fit within the notches for positioning the liner on the base.

7. A feed mixer according to claim 1, wherein the liner is approximately one third to one eighth of the height of the side wall.

8. A feed mixer according to claim 1, wherein the steel liner is formed of stainless steel.

9. A liner for a feed mixer having two side walls, two end walls, and an auger wherein the end walls have a slope and are attached to the side walls, a base connected with the side walls and end walls, the liner is steel and configured to have a truncated conical shape that matches the shape of the end walls and configured such that:
   a bottom of the liner contacts the base separated from the side walls and matches the shape of the path of the auger at the base; and
   a top of the liner contacts the end walls and side walls.

10. A liner according to claim 9, wherein the liner is provided with tabs for positioning the liner on the base.

11. A liner according to claim 9, wherein the liner is approximately one third to one eighth of the height of the side wall.

12. A liner according to claim 9, wherein the steel liner is formed of stainless steel.

13. A feed mixer using an auger, the feed mixer comprising:
   a container comprising:
   two vertical side walls;
   two end walls, wherein the end walls have a slope and are attached to the side walls;
   a base connected with the side walls and end walls; and
   a steel liner configured to have a truncated conical shape having a slope that is at least the same as the slope of the end walls and such that a bottom of the liner at the base has a diameter that matches a diameter of the path of the auger wherein:
   the bottom of the liner contacts the base separated from the side walls; and
   a top of the liner contacts the end walls and side walls.

14. A feed mixer according to claim 13, wherein the auger comprises two augers, the liner comprises two truncated conical shapes each having a diameter that matches a diameter of the path of each of the two augers, respectively, and the feed mixer further includes an internal molding provided to fill a space between the liner and the side walls.

15. A feed mixer according to claim 14, wherein the two truncated conical shapes are joined and provided with a gap at a center of the two auger wells.

16. A feed mixer according to claim 13, wherein the liner is approximately one third to one eighth of the height of the side wall.

17. A feed mixer according to claim 13, wherein the steel is stainless steel.

18. A method of fabricating a feed mixer using an auger, the method comprising:

fabricating two vertical side walls with tabs at a lower end thereof;

fabricating two end walls with tabs at a lower end thereof, the two end walls having a slope;

fabricating a liner configured to have a truncated conical shape having a slope that is at least the same as the slope of the end walls and such that a bottom of the liner has a diameter that matches a diameter of the path of the auger, wherein the bottom of the liner is provided with tabs;

fabricating a base having slots that correspond with the tabs on the side walls, end walls and liner;

welding the side walls and end walls to the base using the tabs and the slots; and welding the liner to the base using the tabs and the slots.

19. A method according to claim 18, the method further comprising welding a top of the liner to the end walls and side walls.

* * * * *